May 25, 1965   W. A. PFAFF ETAL   3,185,025
PHOTOCOPY MACHINE

Filed Aug. 8, 1960   9 Sheets-Sheet 1

INVENTORS
WILLIAM A. PFAFF
FRANCIS T. ARNOLD
EDGAR A. KNIFFIN
SELAH S. BREWSTER, JR.
GEORGE B. CROUSE
BY
Norman H. Holland
ATTORNEY May 25, 1965   W. A. PFAFF ETAL   3,185,025
PHOTOCOPY MACHINE Filed Aug. 8, 1960   9 Sheets-Sheet 7

INVENTORS
WILLIAM A. PFAFF
FRANCIS T. ARNOLD
EDGAR A. KNIFFIN
SELAN S. BREWSTER, JR.
GEORGE B. CROUSE
BY
Norman Holland
ATTORNEY

3,185,025
PHOTOCOPY MACHINE
William A. Pfaff, Huntington, Francis T. Arnold, Port Jefferson, Edgar A. Kniffin, Stony Brook, Selah S. Brewster, Jr., Port Jefferson, and George B. Crouse, Wading River, N.Y., assignors to Peerless Photo Products, Inc., Shoreham, N.Y., a corporation of New York
Filed Aug. 8, 1960, Ser. No. 48,141
9 Claims. (Cl. 88—24)

The present invention relates to a photocopy machine and more particularly to a photocopy machine which is adapted to make photocopies on a continuous strip of photosensitized paper which are either size-for-size, reduced or enlarged.

In handling large numbers of documents, such as checks, invoices or other similar items, it is desirable for the person who is handling these documents to make copies thereof so that there will be a permanent record of the documents handled. This is particularly important in the case of banks which handle a large number of checks drawn on a number of banks throughout the country and which must return the original checks to the banks on which they are drawn. It is desirable for banks to make copies of such checks so that when they return the originals copies will be retained by them. It is sometimes desirable in handling such items to make a copy of a document with a blank stub attached to it so that notations can be made on it.

It has been found that photocopies are the most effective way of making copies of such documents. However, the usual photocopy machines in general use are not satisfactory because they are adapted to make single copies only. More recently there has been developed a photocopy machine in which an original, such as a check, is passed over an exposing cylinder. The exposing cylinder is adapted to reflect the image of the original, by a reflecting system, onto a continuous strip of photosensitive paper fed from a supply roll which is rolled up after exposure on a spool and processed after the spool is filled.

Such machines have the disadvantage of requiring the operator to wait until the spool is finished before copies can be obtained.

Another disadvantage of such machines is the fact that the spool of exposed material must be removed from the machine before it can be processed so that the exposed roll is subjected to an unnecessary amount of light.

Such machines presently in use also have the disadvantage of not being adaptable to make copies of documents, such as checks or the like, with or without a blank stub.

Also, machines in present use do not permit easy removal of the processing solution troughs and the feed cups for cleaning purposes.

Another disadvantage of present machines is the fact that the applicator rollers for applying the processing solution do not apply the processing solutions to the paper by direct contact. Such machines splash the solutions up to the photosensitive paper thereby creating an uneven coating and also spraying the processing solution throughout the interior of the machine.

In presently used machines it has been difficult to determine when the supply of photosensitive paper is exhausted so that sometimes originals are fed without copies being made.

Another disadvantage of present machines is that the application of the processing solution is not confined to the emulsion side of the paper and sometimes spills over the other side of the paper.

Also, it is difficult in present machines to determine when an original is being exposed so that a double exposure sometimes occurs.

Another difficulty with present machines is that loading of the paper could not be accomplished in daylight conditions.

The present invention eliminates these disadvantages and has for one of its objects an improved photocopy machine which will not only expose an original but also process the exposed photosensitive paper and cut the copy from the photosensitive sheet.

Another object of the present invention is to provide an improved photocopy machine in which the copies are processed almost immediately after exposure.

Another object of the present invention is to provide an improved photocopy machine which is easily adapted to provide copies which are of the same length as the original or which have an extra blank space for notations to be noted thereon.

Another object of the present invention is to provide an improved photocopy machine in which the troughs for the processing solution are easily removable so that they may be cleaned.

Another object of the present invention is to provide an improved photocopy machine in which the processing solution is applied directly and uniformly to the photosensitive paper.

Another object of the present invention is to provide an improved photocopy machine which will apply the processing solution to the emulsion side of the photosensitive paper only.

Another object of the present invention is to provide an improved photocopy machine which will operate only when an original is in it and which will indicate to the operator the presence of an original in the machine so that double exposures are eliminated.

Another object of the present invention is to provide an improved photocopy machine which will automatically stop when the source of photosensitive paper has been exhausted.

Another object of the present invention is to provide an improved photocopy machine in which a notcher which will not jam is used.

Another object of the present invention is to provide an improved photocopy machine which may be loaded under daylight conditions.

Another object of the present invention is to provide an improved photosensitive mechanism having an improved cutting mechanism for cutting the exposed photosensitive paper.

Another object of the present invention is to provide an improved photocopy machine that will not cause the moist photo paper to stick on the surface or wrap around tension rollers.

Another object of the present invention is to provide an improved photocopy machine that uses concentric plastic spool plugs that locate, align and act as a brake because of the radial friction caused by the unwind operation of the machine.

Another object of the present invention is to provide a superior system of edge guiding the movable web as it passes through the machine starting from supply spools to the cut off operation.

Another object of the present invention is to provide an improved photocopy machine that dries the developed image while in web form under controlled drying conditions.

Another object of the present invention is to provide an improved photocopy machine in which the notched paper slug is removed without hampering the operation of the machine.

It will be understood that the term photocopy machine whenever used herein relates not only to a copy made by photographic process but to a copy made by any reproductive process and it will further be understood that the term "paper" when used herein refers to any carrier used in a reproductive process.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a rear view thereof;

FIG. 8 is a sectional view taken along line 8—8 of FIG. 5 showing the feeding means for the cutter and the solution feed troughs;

For convenience, the machine will first be described generally and the various parts will be described under separate headings.

*General description*

Figure 1:
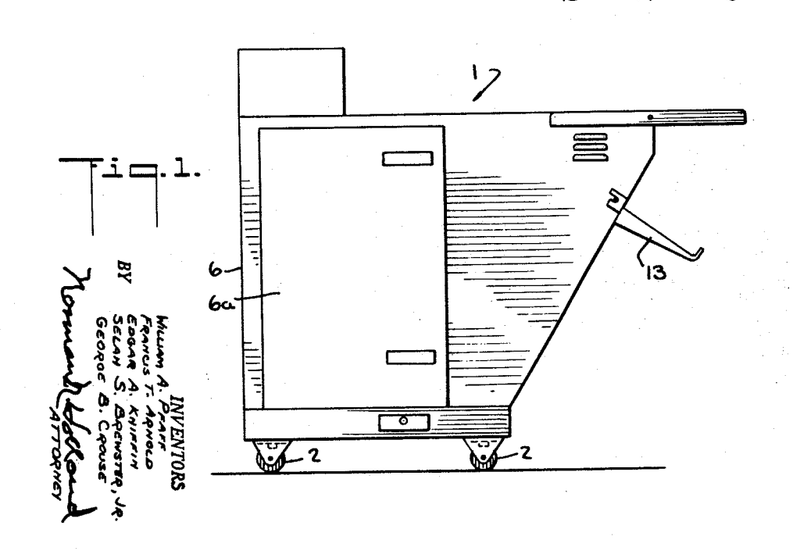
FIG. 1 is a side elevational view of the machine embodying the present invention.

Referring to FIGS. 1, 2, 3 and 4, the photocopy machine 1 of the present invention is mounted on a plurality of wheels 2 to give the machine movability. The machine 1 has a viewing section A, a reflecting section B, an exposing-developing section C and a cutter section D. Viewing section A and reflecting section B are separated by a partition 3; reflecting section B and exposing-developing section C are separated by a suitable partition 4; and the partition 5 separates the exposing-developing section C and the cutting section D. A suitable shell or cover 6 encloses the machine. Processing solution bottles 7 and 8 as shown in FIGS. 1 and 3, are mounted adjacent the exposing-developing section C to supply the processing solution to the solution troughs 9 and 10, respectively.

The original O, which may be a check or the like, is moved into the machine through a suitable opening 15 at the top and is fed by a rotating idler feeder roller 16 over a rotating transparent cylinder 17 which is preferably made of glass or other suitable material.

As the original O is passed into the machine a pair of microswitches 18 (only one shown in drawings) is activated which will turn on the exposing light sources 14 and start rotation of the transparent cylinder 17. The light will strike the original O which is passing between the feeder roller 16 and the transparent cylinder 17 and will be reflected through the transparent cylinder 17 into the reflecting section B through a slit 19 in the partition 3. The original O then passes out of the machine through an opening 12 and onto a catch tray 13.

In the reflecting section B, the image is then concentrated by the lens 20 onto the mirror 21 which will reflect the image through the slit 22 in the partition 4 and onto a sheet of photosensitive paper S passing over an image roller 23 in the exposing-developing section C.

The sheet of photosensitive paper S is being fed from a supply roll 25 thereto and is passed over a notcher 26 which makes a notch in the edge of the paper. The operation of the notcher 26 is triggered by the microswitch 18 upon the introduction of the original, as will be more fully explained hereinafter. The paper then passes between image roller 23 (where the reflected latent image from mirror 21 is formed on the emulsion side of the sheet S) and activator or developer roller 27 which applies the developing solution to the strip 3. The paper then moves over the stabilizer roller 28 which applies the developing solution to the strip 3. The paper then moves over the stabilizer roller 28 which applies the stabilizer solution thereto which sets the image.

Suitable guide means, such as guides 120 (FIG. 8), maintain the paper centered and keep the processing solution away from the side walls of the machine.

Thereafter, the strip continues upwardly over a rotating drying drum 29 in the exposing-developing section C which dries the sheet and, through opening 30 in partition 5, to the cutting section D where cutting knives 31 and 32 are activated by the notch made in the edge of the paper to cut the strip into segments 33. Each segment will be a copy of the original. The copy 33 is then ejected from the machine through a suitable exit opening 34 in the cutter section D.

In one method of operation as explained more fully hereinafter the length of strip S which is exposed is controlled by a timer 35 which controls the length of time that the exposing lights 14 are in operation. The timer 35 may be a conventional timing mechanism and in the preferred embodiment of the invention, the timer 35 is a time delay unit sold under the trademark "Agastat." The timer 35 is set so that the light source 14 remains in operation after the original passes the microswitch 18 so that the paper S continues to be exposed for a time interval determined by the setting on the timer. This will produce copies of the originals with small spaces therebetween.

On the other hand, as will also be more fully described hereinbelow, if it is desired to have a blank stub of a predetermined size on the copy 33, the timer 35 is set at a zero reading and a special exposing cylinder (described in detail below) is used which maintains a microswitch 18 actuated to keep the light sources 14 in operation and continue exposure of strip S to produce a copy of the original which is being exposed and an added length of blank material which is used as a stub for notations.

*Viewing and reflecting sections*

The viewing section A is shown in detail in FIGS. 4, 5, 6 and 7 and comprises a transparent cylinder 17 which is rotated by any suitable means, such as a motor 40 through chain 40a, and a plurality of light sources 14 on each side thereof mounted on the partition 3. The cylinder 17 is mounted within a suitable shield 41 which prevents any stray light from moving out of the viewing section A.

A pair of microswitches 18 are positioned above the light sources 14 and are provided with a feeler finger 42 adapted to be swung or deflected downwardly by the original O to turn on the light sources 14. Light sources 14 are shown in the form of bulbs which have a reflective coating 14a which cuts off the light and reflects it toward the exposing roller 16. In order to prevent the operator from inserting another original into the machine while an original is being exposed, the activation of the microswitches 18 by the original O also lights up a sign 44 (FIG. 2), on the top of the machine which may have the world "wait" or some other suitable indicia on it, which will tell the operator that there is an original being exposed. This sign 44 will remain lit until the original moves past the microswitches 18. The operator should wait until this sign 44 goes out before inserting the new original.

The rays from the light sources 14 strike the original substantially at the point of contact between feeder roller 16 and the transparent cylinder 17 and will be reflected through the transparent cylinder 17 back through the slit 19 in partition 3 and into the reflecting section B. The slit 19 may be provided with adjustable plates 43 so as to permit adjustment in the opening of slit 19. The feeder roller 16 has pins 121 extending therefrom (FIG. 7) which are adapted to lie in slot 122 formed in side plates 123 to permit easy removal of the roller 16.

Figure 5:
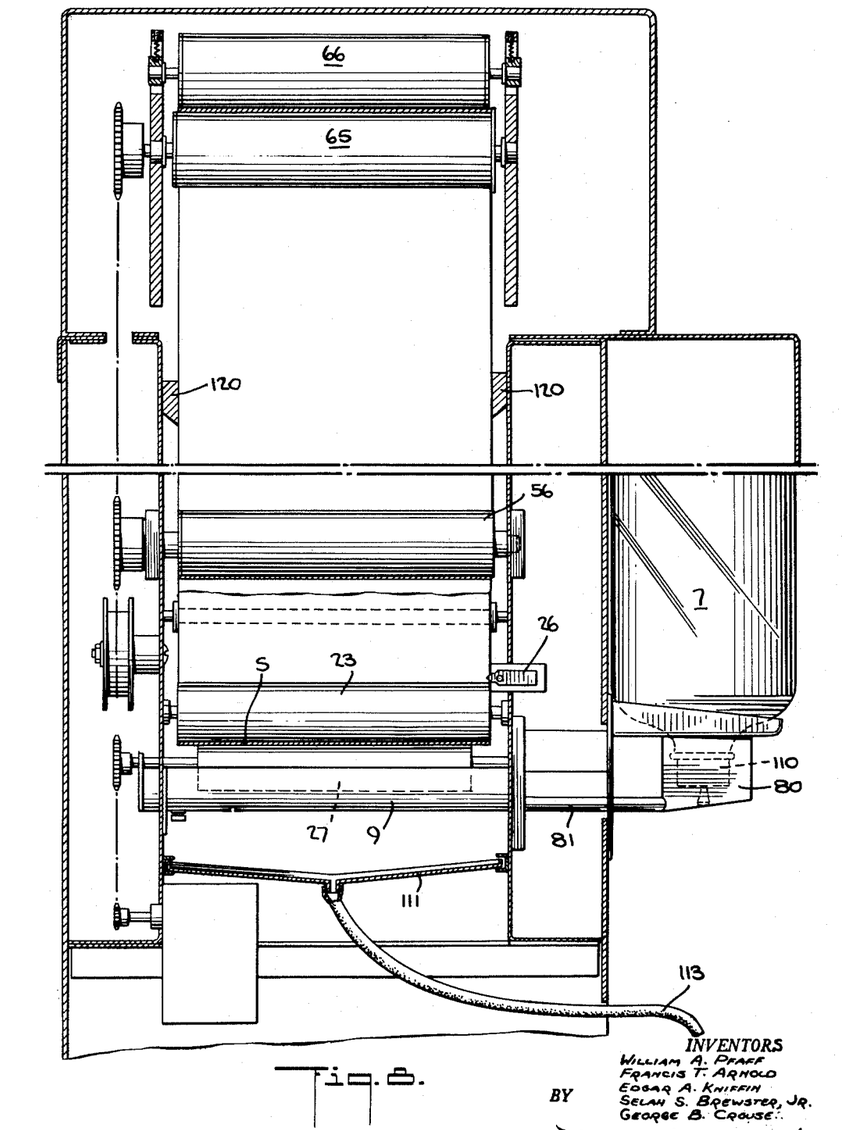
FIG. 5 is a view similar to FIG. 4 showing the details of the machine.
Figures 6, 7:
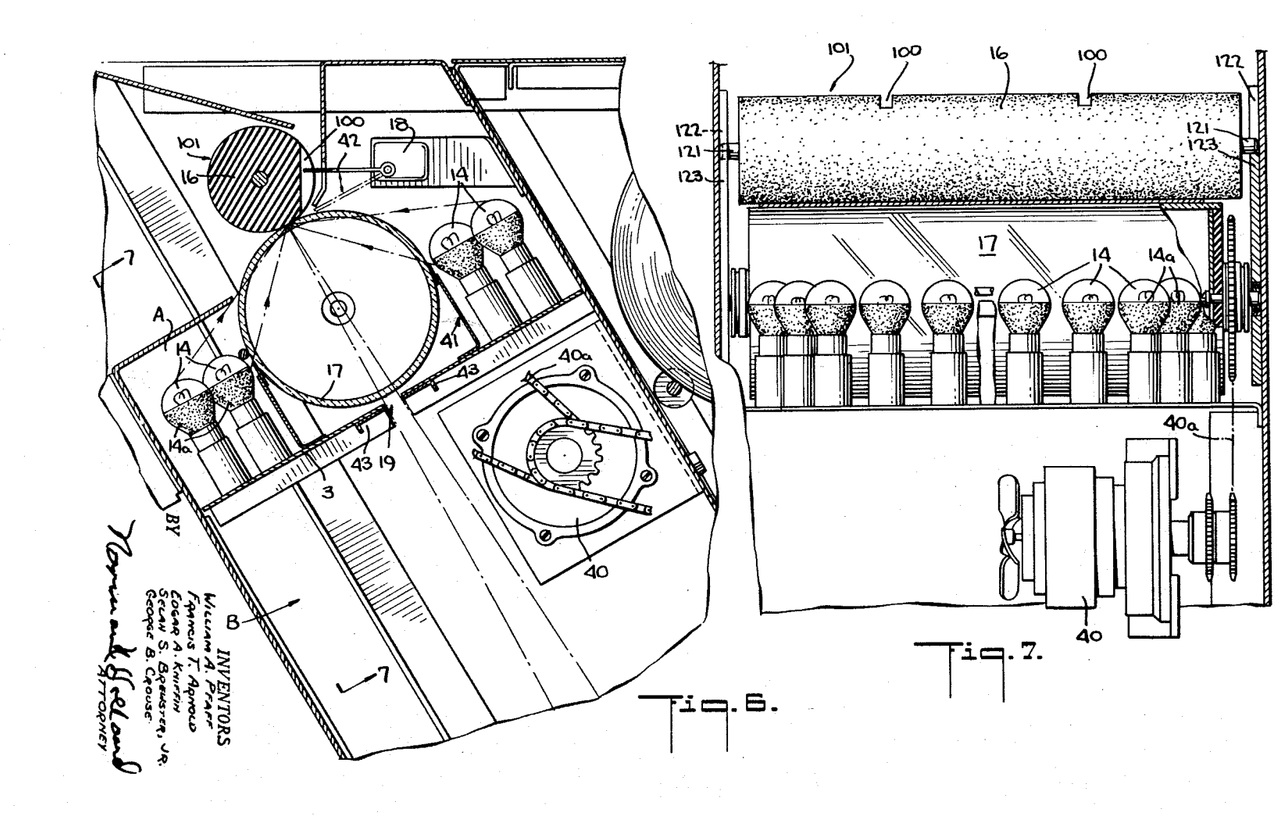
FIG. 6 is an enlarged sectional view showing the exposing section of the machine.
FIG. 7 is a sectional view taken along line 7—7 of FIG. 6 showing the lighting elements in the machine.

As shown in FIGS. 5, 6 and 7 the feeder roller 16 has a pair of partial notches 100 therein into which the feeler fingers 42 of the microswitches 18 are adapted to normally lie. The use of this feeder roller with the partial notches 100 will produce a copy with a blank stub. When the original O is first passed between the feeder roller 16 and the transparent cylinder 17 the original will deflect the feeler fingers 42 downwardly which will actuate the motor 40 to start the rotation of the transparent cylinder 17 and the feeder roller 16 and will operate the notcher to form a notch in the paper S. Also, the light sources 14 will be simultaneously turned on and the "wait" signal 44 (FIG. 2) will flash.

As the feeder roller 16 rotates with the partial notches 100, feeler fingers 42 which have been deflected downwardly by the original O are now engaged by the outer peripheral edge 101 of the feeder roller 16 and are maintained in their downwardly deflected position. The feeler fingers 42 remain in this downwardly deflected position under the influence of the peripheral edge 101 of feeder roller 16 even after the original O has passed out of the machine. This will maintain the light sources 14 on and will continue to expose the photosensitive sheet S to light rays. Since the roller 16 is black, the continued exposure will leave a light blank space adjacent the copy which may be used as a stub on which notations can be made.

Figures 1, 5A, 5B, 5C:
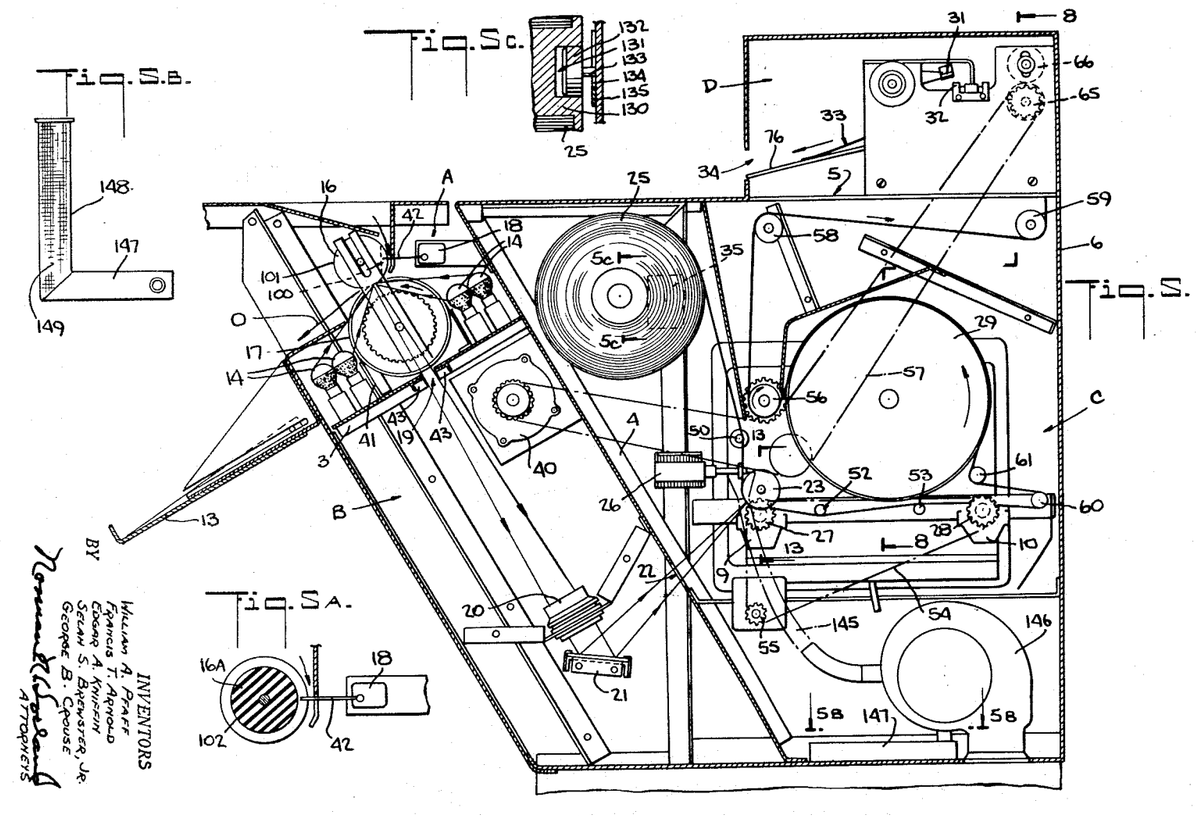
FIG. 5A is a sectional view showing a modification in the operation of the machine.
FIG. 5B is a sectional view taken along line 5B—5B of FIG. 5 showing the means for removing the slugs cut by the notcher.
FIG. 5C is a sectional view along line 5C—5C of FIG. 5 showing the improved friction brake means.
Figure 2:
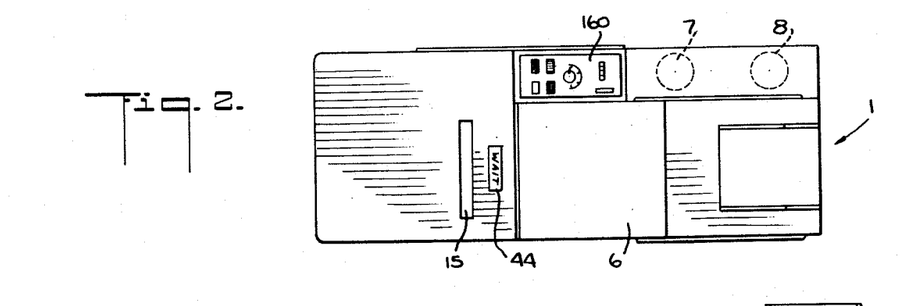
FIG. 2 is a top plan view thereof.

On the other hand, as shown in FIG. 5A, if a copy without a blank stub is required, the feed roller 16A is used which has a pair of continuous peripheral grooves 102 therein into which the feeler fingers 42 of the microswitches 18 lie. With this arrangement the microswitch is deflected only by the original O being passed thereby and after the original moves past the feeler fingers 42, they will be lifted up to their original positions to shut off the light sources 14 and stop the exposure of the photosensitive sheet, unless the timer unit 35 is set to continue the exposure (as more fully described hereinafter). With this arrangement the copy will have substantially the same length as the original being exposed without a blank stub.

It will be seen that by mere substitution of the particular feeder roller used and by setting the timer 35, as explained above, the operator has the choice of reproducing the original with or without a blank stub.

*Exposing-developing section*

Figure 4:
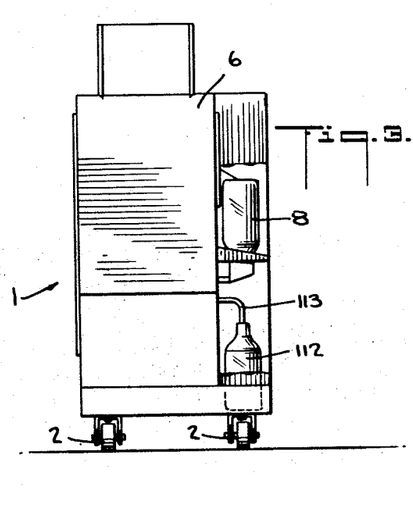
FIG. 4 is a schematic diagrammatic view showing the operation of the machine.

The exposing-developing section C is shown in FIGS. 4 and 5 and comprises a supply roll 25 of photosensitive paper. The support for the supply roll 25 is shown in FIG. 5C and comprises a core 130 having an opening 131 therein into which is inserted a plug 132. The plug 132 is mounted by pins 133 into slots 134 of the plates 135 affixed to the side walls of the mechanism. The plug 132 frictionally engages the periphery of opening 131 to act as a brake for the roller 25 when no paper is being supplied.

The strip of paper S passes over the paper supply signal roller 50, which is adapted to indicate when the supply of paper is exhausted, and under the image roller 23 where the latent image reflected from the mirror 21 will be formed on the emulsion of the photosensitive strip S.

Before the photosensitive sheet S passes over the image roller 23 it moves past a suitable notcher 26 which cuts a notch in the edge of the paper which will actuate the cutting knives 31–32 as will be more fully described hereinafter.

The paper then moves over the rotating developing solution applicator roller 27 which lies in the developing solution trough 9 and which applies an activator or developing solution to the emulsion side of the sheet S to develop the image.

Figure 13:
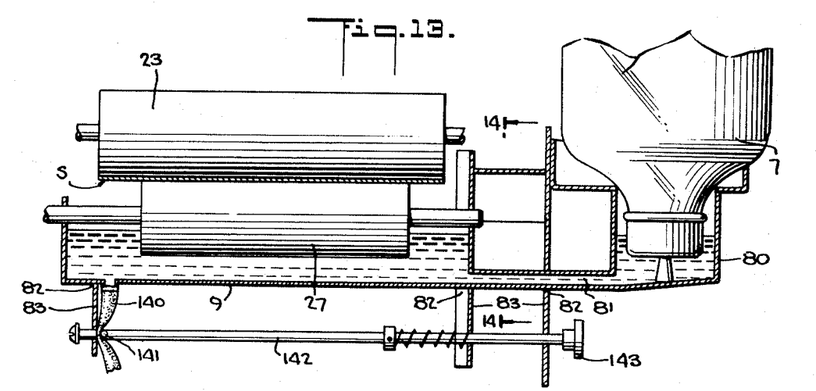
FIG. 13 is a sectional view taken along line 13—13 of FIG. 5 showing the improved applicator rollers and the solution trough.

Referring to FIG. 13 of the drawings, the developing solution applicator roller 27 is of less width than the width of the paper S so that the solution will be applied only to the emulsion side of the paper S and will not go above the paper.

It will also be noted that the developing solution is applied directly to the photosensitive sheet S by the applicator roller 27 so that the amount of developing solution applied is uniform and so that there is no splashing of the solution.

The strip of paper then moves under and over idle rollers 52 and 53 and from thence over rotating stabilizer applicator roller 28 which applies a stabilizer solution from the stabilizer trough 10 to stabilize or set the image. Here again, the applicator roller 28 is of lesser width than the strip of paper S so that the solution will be confined to the emulsion side of the sheet and will not go over the sheet.

It will also be noted that the stabilizer applicator roller 28 is adapted to apply the stabilizing solution directly to the paper S so as to apply the solution uniformly over the paper and to prevent splashing. The applicator rollers 27 and 28 may be rotated in synchronism with each other by means of chain 54 driven by a suitable motor 55.

The sheet S now moves under and over idler rollers 60 and 61 and over the rotating idler drying drum 29 which has its temperature controlled by a suitable thermostat (not shown) to maintain a constant temperature. The drying drum 29 heats the strip S to dry it and permits a dry copy to be obtained.

The paper then moves over and under idle rollers 59 and 58 (which may be made of a plastic, such as that sold under the trademark Teflon to prevent paper from being wrapped around) and up through opening 30 in partition 5 into the cutter section D which cuts the strip of paper into segments as will be more fully described hereinafter.

Figures 15, 18:
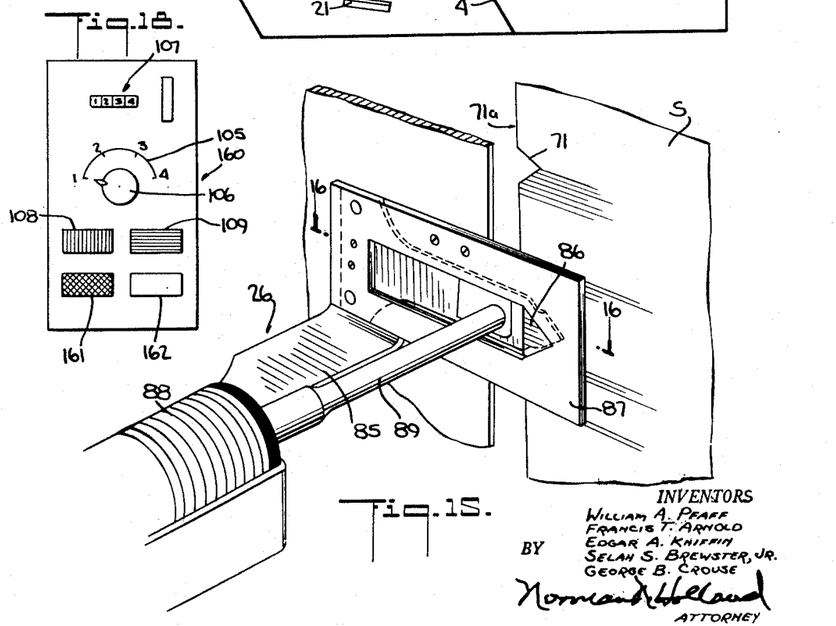
FIG. 15 is a perspective view showing applicant's improved notching mechanism.
FIG. 18 is a plan view of the control panel used for operating the machine.

When the supply roll 25 of paper is exhausted, the paper supply signal roller 50 will flash a suitable light 111 on the control panel 160 shown in FIG. 18 indicating that the paper should be replaced. The machine may be re-loaded by opening access door 6a (FIG. 1) and affixing the leader of the new roller to the trailing end of the old roll. The leader is preferably dark to permit loading in daylight.

Cutter section

The cutter section D is shown in FIGS. 4, 5 and 9 through 12 and comprises a rotating drive roller 65, which is driven by motor 40 through sprocket chain 57, and a spring-pressed pressure roller 66 which may be made of Teflon. The paper S is moved by the rollers 65-66 to a platform 67 which directs the paper to the cutters 31-32. Suitable clamps 68 hold the paper S on the platform 67. Adjacent the platform 67 (FIGS. 9 and 10) is a microswitch 69 having a spring-pressed feeler finger 70 which is adapted to enter into a notch 71 in the paper S to actuate the knives 31-32.

Figure 9:
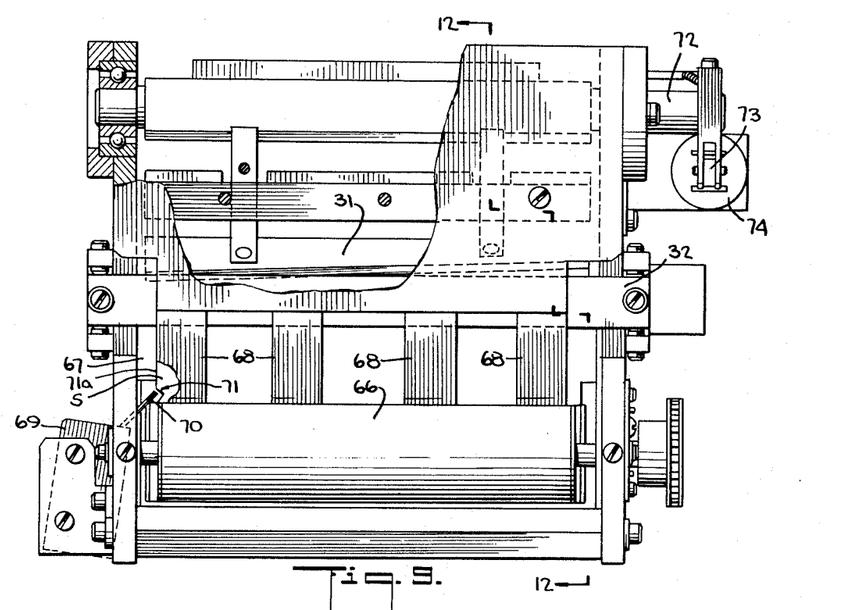
FIG. 9 is a plan view partly in section showing the cutter.
Figure 10:
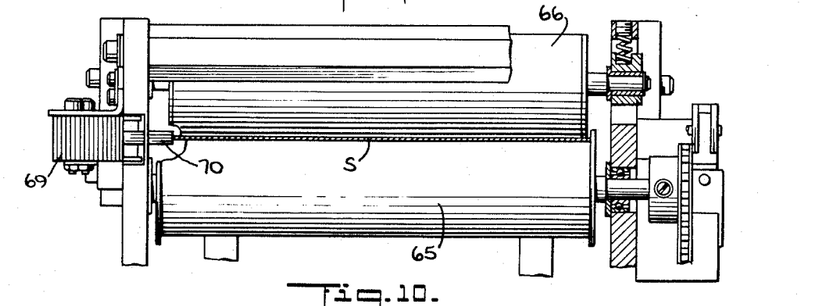
FIG. 10 is an elevational view of the cutter shown in FIG. 9.
Figure 10A:
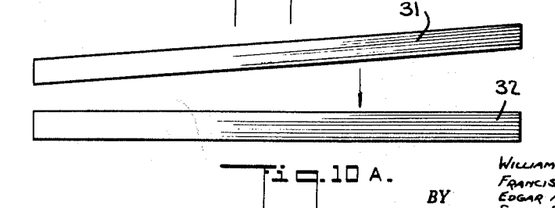
FIG. 10A is a diagrammatic view showing the normal position of the cutters.

The cutters comprise a stationary blade 32 and a reciprocable blade 31 mounted on a pivot 72. The movable blade 31 is moved downwardly by the armature 73 of a solenoid 74 which is energized by the microswitch 69 when feeler finger 70 enters into the notch 71 in the paper S. As shown in FIG. 10A, the movable blade 31 is vertically angled with respect to the stationary blade 32 so as to make a clean cut and to prevent any tearing action. As shown in FIG. 9, the movable blade 31 is also horizontally angled with respect to blade 32 to permit clearance as the blade 31 descends in an arc when cutting.

Figure 11:
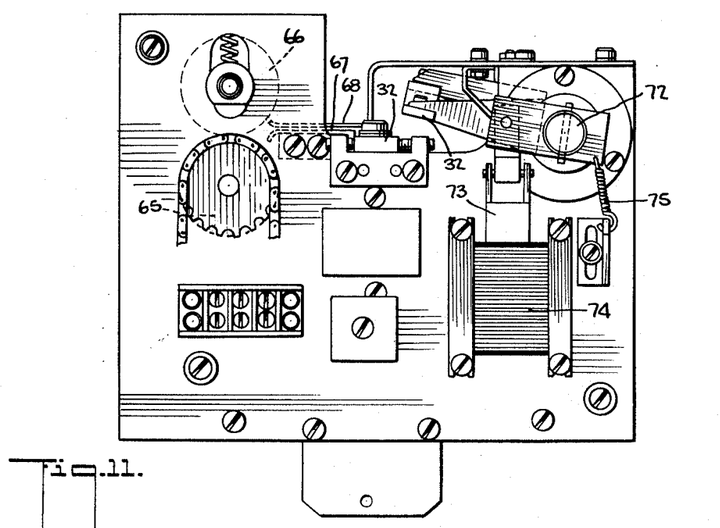
FIG. 11 is a side elevational view of the improved cutter showing the actuating means.
Figure 12:
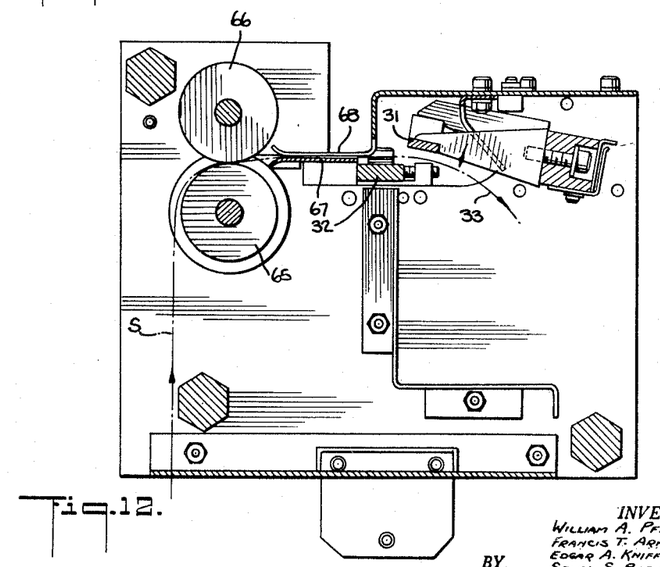
FIG. 12 is a sectional view of the cutter taken along line 12—12 of FIG. 9.

In operation, the paper is fed between the rollers 65 and 66 with the feeler finger 70 of the microswitch riding on the outer edge 71a of the strip S. When a notch 71 is presented to the finger 70 it enters into the notch in the edge of the paper and closes a circuit which energizes the solenoid 74 which pulls the armature 73 downwardly to depress the blade 31 and move it downward in an arc to cut the strip. After the paper S has been cut, the feeler finger 70 moves out of the notch 71 in the paper thus de-energizing the solenoid 74 and returning the blade 31 to its original upwardly directed position by a suitable spring 75 (FIG. 11).

Each segment 33 of paper cut by the cutters is a copy of the original. It will be noted that the position of the notch 71 in the edge of the paper determines the length of the strip cut and the greater the distance between notches, the longer will be the paper cut.

The copy is then deposited on an ejector platform 76 (FIG. 5) where it moves out of the machine through opening 34.

Solution troughs

Figure 14:
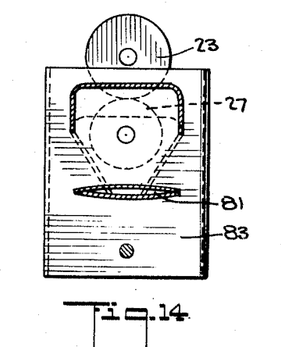
FIG. 14 is a sectional view taken along line 14—14 of FIG. 13.

The activator and stabilizer solutions are fed to the stabilizer and activator troughs 9 and 10 by suitable feed bottles 7 and 8 (FIGS. 13, 14, 1 and 2). The troughs 9 and 10 are preferably identical to each other, however, for convenience, they will be described in connection with trough 9 only as shown in FIGS. 8, 13 and 14.

The trough 9 communicates with a feed cup 80 or bottle holder by an integral passageway 81. An inverted supply bottle 7 is mounted in feed cup 80. It will be noted that the trough 9 and the bottle holder 80 are integral with each other and are insertable into openings 82 in the framework 83 of the machine as shown in FIG. 13. A flexible drain pipe 140 is mounted beneath trough 9 and is normally closed by the pin 141 of a spring-pressed plunger 142 having a knob 143 on the outside of the machine. Thus when the trough 9 is to be removed, the plunger 142 is first pulled out thereby opening drain pipe 142 to drain the solution therein and prevent it from spilling when the trough 9 is removed.

With this construction the trough 9 together with the bottle holder 80 and the feed bottle 80 may be removed from the machine in one piece and may be washed out or otherwise cleaned when necessary. This provides a simple arrangement whereby the troughs and the bottles may be easily removed and replaced for cleaning purposes.

The bottles 7 and 8 may be provided with a suitable feed valve 110 which will feed the solution to the troughs when the amount of solution in the troughs 9 and 10 goes below a predetermined level.

A drain plate 111 (FIG. 8) is provided below the troughs 9 and 10 into which the solutions are deposited when the troughs 9 and 10 are to be removed for cleaning purposes. The solution drains from plate 111 to drain bottle 112 (FIG. 3) by means of drain pipe 113.

Notcher

Figure 16:
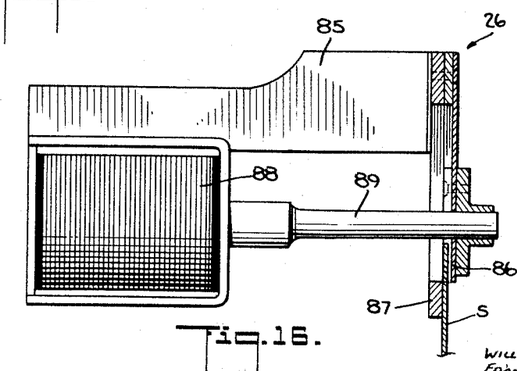
FIG. 16 is a sectional view taken along line 16—16 of FIG. 15.
Figure 17:
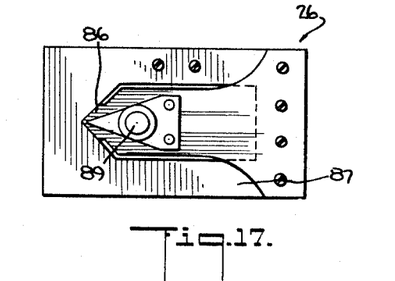
FIG. 17 is a front view of the notcher shown in FIGS. 15 and 16.

Applicants' improved notcher 26 is shown in FIGS. 15, 16 and 17 and comprises a frame 85 on which is mounted a punch 86, a die 87 and a solenoid 88. The punch 86 is actuated by the solenoid 88 to which it is connected by armature 89 to cut a notch 71 in the edge 71A of the photosensitive sheet S passing thereby.

As will be noted from the drawings the shape of the punch and die 86-87 is in the form of a V. This will permit the punch 86 to punch out V-shaped notches 71. It has been found that the use of a V-shaped punch 86 eliminates jamming of the notching operation and hence prevents a breakdown of the machine.

In operation, the paper S moves between the punch 86 and the die 87. When the solenoid 88 is energized by the insertion of an original into the machine the armature 89 is pulled inwardly thereby pulling the punch 86 backward and cutting a V-shaped notch 71 in the paper S.

In order to prevent the V-shaped slugs cut by the notcher flying around the machine, a take-off pipe is located below notcher 26 and connected to a blower 146 which sucks the slugs from the notcher 26 and blows them to a conduit 147 and from thence to a removable receptacle 148 (FIG. 5B) having a wire mesh removable cover 149.

Control panel

The control panel 160 from which the operator controls the machine is shown in detail in FIG. 18.

The control panel 160 is provided with a light intensity dial 105 and with a control knob 106 thereon, so that turning the knob clockwise will intensify the light emitted from light sources 14. A counter 107 is also provided in the control panel so as to indicate the number of prints which have been made.

The control panel also has three switches 108, 109 and 161. Each of these switches may have lamps therebeneath which may light up to facilitate observation and they may be of different colors for convenience. The stand-by or main power switch 108 may be colored green and is depressed to turn on the power. When depressed it will light up to indicate that the power is on. A space advance switch 109 may be colored yellow and is depressed to advance the paper S so that a copy may be processed quickly, if desired. The "advance" switch 109 is adapted to light up when depressed. A notcher shut-off switch 161 may be colored red and is usually lit indicating that the notcher is in operation. When depressed the light will go out and the notcher not operate so that the copies will not be cut.

A paper supply indicator 162 which may be colored white, indicates when it lights up that the supply of paper has become exhausted.

It will be understood of course that the colors and positions of the switches 108 to 161 and the indicator 162 may be changed as may be desired and that other type control switches may be used if desired.

Electrical circuit

Figure 19:
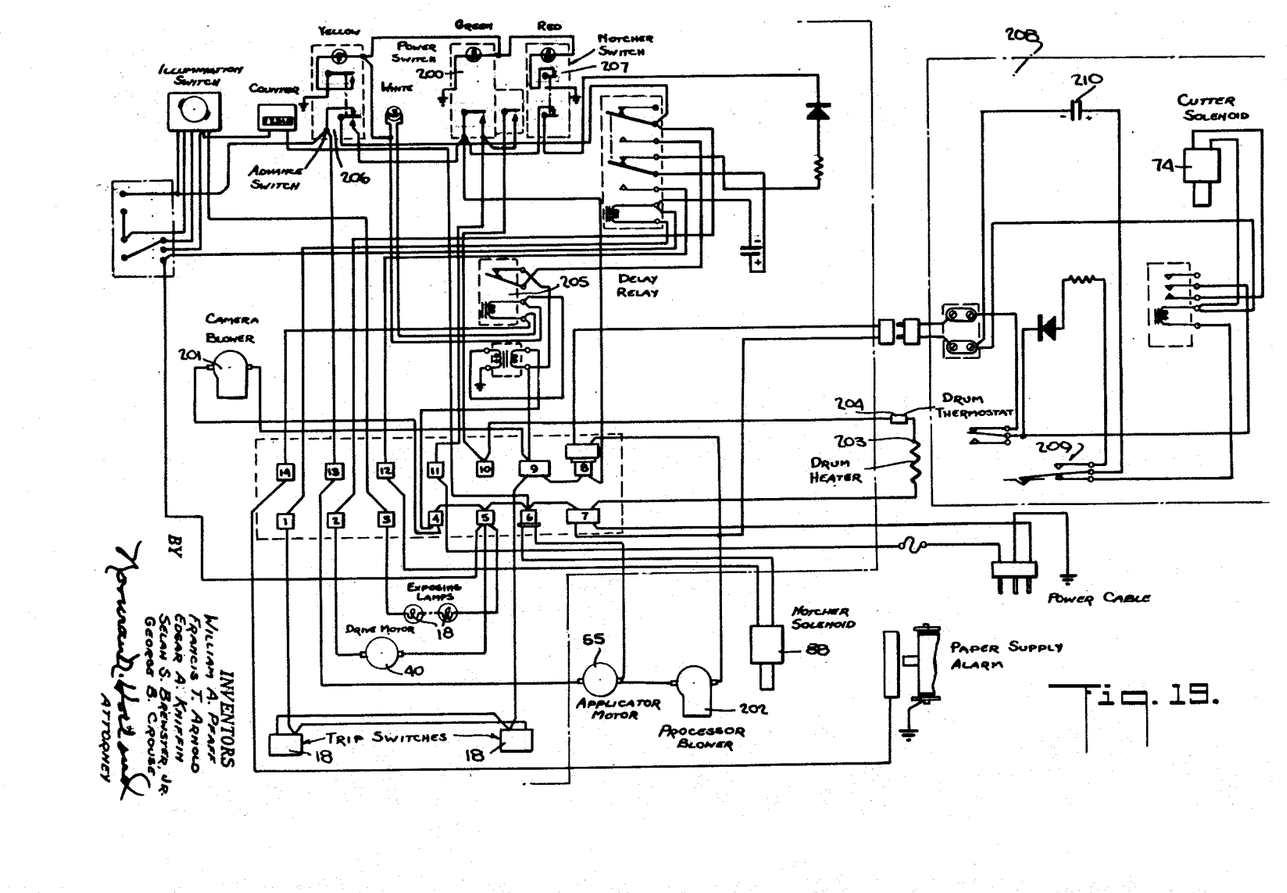
FIG. 19 is a schematic view of the electrical system used with the present invention.

FIG. 19 is a diagrammatic view showing the electrical system used to operate the machine of the present invention.

The main power switch 200 furnished power to the heat exhaust blower 201 for the camera section, the heat exhaust blower 202 for the processing section, the drum heater 203, thermostat 204 (which is of the adjustable type), the transformer 205, and trip microswitches 18.

When an original is inserted, the microswitches 18 operate to light lamps 14 which are wired in series so that if one lamp burns out all lamps will go out. Power switch 200 also supplies power to the advance switch 206, notcher switch 207 and cutter assembly 208. It is desirable to allow a warm-up period before operating the machine to insure a good drying rate.

Insertion of an original also operates drive motor 40 and the applicator motor 55. The trip switches 18 operate the notcher solenoid 88 which cuts a V-shaped notch in one side of the sensitized paper.

The V-shaped notch engages a microswitch arm 209 which closes the open microswitch contacts to discharge capacitor 210. The capacitor 210 is discharged through the solenoid of movable knife blade to slice the paper to the desired length.

Operation

While the operation of applicants' invention is obvious from the foregoing description, it will be briefly reviewed for convenience.

The original O is inserted between the feeder roller 16 and the transparent glass cylinder 17. The insertion of the original swings feelers 42 downward and actuates microswitches 18 which turn on the light sources 14. Light then reflects the image of the original O toward the lens and mirror system 20–21 and from there to the image roller 23 in the developing section C.

In the meantime, photosensitive paper S is being fed from the supply roller 25 past the notcher 26. The notcher 26 will be energized by the tripping of microswitch 18 by the original to cut a V-shaped notch 71 in the edge 71a of the strip of paper S.

The exposed paper S is then processed by passing over a developing or activator applicator roller 27 to develop the image and a setting or stabilizer solution roller 28 to set the image. The paper is then moved over the drying drum 29 which dries the sheet and the paper S then moves to the cutting section D. The paper S moves between the rollers 65 and 66 and the edge 71a of the paper S is felt by the feeler 70 of the microswitch 69. When a notch 71 appears in the edge 71a of the paper, the feeler will move inwardly thereby closing a circuit which energizes the solenoid 74 and depresses the movable blade 31 to cut a segment of the paper S to form a copy 33.

If it is desired to obtain a copy which is the same length as the original without a blank stub for notations the roller 16A having the circumferential grooves 102 is inserted in the machine. The timer 35 is set at the desired setting so as to give proper spacing between the copies. With this arrangement, when the original is inserted and the feeler fingers 42 of the microswitches 18 will be deflected downwardly to expose the original. When the original moves past fingers 42 of microswitches 18, the timer 35 will maintain the light sources 14 operating for a predetermined interval so as to leave a space between copies.

On the other hand, if it is desired to produce a copy which has a blank stub thereon, the roller 16 with the partial grooves 100 therein may be used and the timer 35 is set at "zero." The outer surface of the roller 16 may have certain notations thereon which will appear on the stub to be filled in.

With this arrangement when the original is inserted and the feeder roller 16 starts to rotate, the microswitch feelers 42 will continue to be depressed by the periphery 101 of the roller 16 to continue exposing a blank portion of the sheet S. This will then be cut by the cutter to form a copy of the original plus a blank stub on which notations may be made.

It will be seen from the above that the present invention provides an improved photocopy machine which will expose an original, process the exposed sheet and deliver a cut copy.

The present invention also provides an improved photocopy machine which is easily adaptable to provide a copy with or without a blank stub thereon and in which the machine will indicate when an original is being exposed so as to avoid double exposures. The present invention also makes provision for improved applicator rollers which will apply the processing solutions to the photosensitive paper directly and uniformly which will confine the application of the solution to the emulsion side of the paper. The invention provides an improved trough and bottle holder assembly which can be easily removed and cleaned in one unit and will prevent the machine from continuing to operate after the source of supply is exhausted.

The present invention also provides an improved means for notching the edge of the paper without jamming and an improved cutter which will cut the copy cleanly without tearing.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a photocopy machine, a feeder roller and a transparent cylinder in contact with said feeder roller adapted to receive an original therebetween, a light source adjacent said feeder roller adapted to be actuated by said original to turn on said light source, said cylinder being adapted to permit the image of said original to be passed through it to a sheet of photosensitive paper to expose a portion of said paper, means for notching said sheet at predetermined intervals, means for processing said photosensitive paper, and means responsive to said notch for cutting said exposed portion of said sheet.

2. A photocopy machine as claimed in claim 1, wherein said means for turning on said light sources also actuates means for indicating that an original is being exposed.

3. A photocopy machine as claimed in claim 1, wherein said means for turning on said light source comprises a microswitch having a feeler finger extending therefrom and wherein said feeder roller has a peripheral groove into which said feeler finger extends whereby said feeler finger will be deflected by an original passing thereby and will return to its original position after the original has passed.

4. A photocopy machine as claimed in claim 1, wherein said means for turning on said light source comprises a microswitch having a feeler finger extending therefrom and wherein said feeder roller has a partial groove therein to receive said feeler finger whereby said feeler finger will be deflected by an original passing thereby and will be contacted by the outer circumference of the roller to remain in its deflected position until the partial groove is again in position.

5. In a photocopy machine, a feeder roller and a transparent cylinder adapted to receive an original therebetween, a light source adjacent said transparent cylinder, a microswitch adjacent said feeder roller and adapted to be energized by an original passing therein to turn on said light source, a strip of photosensitive material, said strip being movable from a source of supply to a cutter, a signal roller in contact with said paper to indicate when said source is exhausted, a notcher adapted to place a notch in the edge of the paper, means for reflecting the image of said original to said photosensitive paper, troughs for activator and stabilizer solutions removably mounted on said machine and having feed cups integral therewith, an applicator roller mounted in each trough, said paper being movable into direct contact with said rollers to permit an activator and a stabilizer solution to be directly applied thereto, said applicator rollers being of less width than said paper to confine to application of the solutions to the emulsion side of the paper, means for moving said paper over a heated drum to dry it, a cutter comprising a stationary blade and a movable blade angled with respect to said stationary blade, said movable blade mounted on a pivot and activated by a solenoid, a microswitch in advance of said cutter having a finger to sense the edge of the blade, said finger being adapted to enter into the notch in the paper to energize the solenoid to depress said blade to cut a segment of said paper.

6. In a photocopy machine, means for moving an original past a light source, said light source being activated by said moving original, a continuous sheet of photosensitive paper, said sheet being movable from a source to a processing solution, a signal roller interposed between said source on said processing solution, said sheet passing over said signal roller, said signal roller being adapted to stop the operation of the machine when the supply is exhausted, means for reflecting the image of said original to said sheet of photosensitive paper to expose a portion of said paper to the image, means for applying a notch to said sheet at predetermined intervals, means for processing said sheet of photosensitive paper, and means responsive to said notch for cutting said exposed portion of said sheet.

7. In a photocopy machine, means for moving an original past a light source, said light source being activated by said moving original, means for reflecting the image of said original to a sheet of photosensitive paper to expose a portion of said paper, means for notching said sheet at predetermined intervals, said notching means comprising a punch and a die, a solenoid mounted on said machine, said die being mounted on said solenoid, said punch being mounted on the armature of the solenoid, said paper being adapted to pass between said punch and die, said punch being movable upon energization of said solenoid to punch a notch on said paper, means for processing said photosensitive paper, and means responsive to said notch for cutting said exposed portion of said sheet.

8. In a photocopy machine, means for moving an original past a light source, said light source being activated by said moving original, means for reflecting the image of said original to a sheet of photosensitive paper to expose a portion of said paper, means for applying a notch to said sheet at predetermined intervals, an application roller of less width than said paper for applying a processing solution directly to said photosensitive paper, and means responsive to said notch for cutting said exposed portion of said sheet.

9. In a photocopy machine, means for moving an original past a light source, said light source being activated by said moving original, means for reflecting the image of said original to a sheet of photosensitive paper to expose a portion of said paper, means for applying a notch to said sheet at predetermined intervals, a trough in said machine, an applicator roller mounted in said trough, a feed cup adapted to receive a feed bottle therein, said feed cup being integral with and communicating with said trough to supply a solution thereto, said trough and feed cup being removably mounted on said machine in a unit, means for processing said photosensitive paper, and means responsive to said notch for cutting said exposed portion of said sheet.

References Cited by the Examiner

UNITED STATES PATENTS

| | | | |
|---|---|---|---|
| 1,457,231 | 5/23 | Scott | 225—27 |
| 1,808,669 | 6/31 | Liberman | 95—14 |
| 2,251,570 | 8/41 | Hessert | 88—24 |
| 2,313,860 | 3/43 | Bogue | 83—371 X |
| 2,320,272 | 5/43 | Friden | 83—54 |
| 2,455,187 | 11/48 | Owens. | |
| 2,582,001 | 1/52 | Bornemann et al. | |
| 2,717,069 | 9/55 | Driscoll | 88—24 X |
| 2,735,335 | 2/56 | Shaw | 88—24 |
| 2,751,814 | 6/56 | Limberger | 88—24 |
| 2,782,678 | 2/57 | Taylor | 88—24 |
| 2,815,075 | 12/57 | Braunstein et al. | 83—371 X |
| 2,928,328 | 3/60 | Klein | 95—75 |
| 2,949,839 | 8/60 | Aronson et al. | 95—89 |
| 3,060,829 | 11/62 | Leighton et al. | 95—89 |

NORTON ANSHER, *Primary Examiner.*

EMIL G. ANDERSON, *Examiner.*